(12) United States Patent
Mountain

(10) Patent No.: US 8,873,938 B2
(45) Date of Patent: Oct. 28, 2014

(54) HANDLING REQUESTS WHEN AVAILABLE CHANNEL SELECTORS ARE IN USE

(75) Inventor: Dale Llewelyn Mountain, Silsden (GB)

(73) Assignee: Eldon Technology Limited, Steeton (GB)

(*) Notice: Subject to any disclaimer, the term of this patent is extended or adjusted under 35 U.S.C. 154(b) by 0 days.

(21) Appl. No.: 13/232,848

(22) Filed: Sep. 14, 2011

(65) Prior Publication Data

US 2013/0064526 A1 Mar. 14, 2013

(51) Int. Cl.
*H04N 5/76* (2006.01)
*H04N 5/775* (2006.01)
*H04N 5/782* (2006.01)

(52) U.S. Cl.
CPC .......... *H04N 5/76* (2013.01); *H04N 5/775* (2013.01); *H04N 5/782* (2013.01)
USPC ........... 386/291; 386/292; 386/293; 386/295; 386/296; 386/297; 386/298; 386/228; 386/229; 386/230

(58) Field of Classification Search
USPC .......... 386/291–293, 295–298, 228–230
See application file for complete search history.

(56) References Cited

U.S. PATENT DOCUMENTS

| | | | |
|---|---|---|---|
| 2008/0196065 A1* | 8/2008 | Cheng et al. | 725/58 |
| 2010/0158476 A1* | 6/2010 | Hao et al. | 386/83 |
| 2011/0164861 A1* | 7/2011 | Kunkel et al. | 386/343 |
| 2012/0189269 A1* | 7/2012 | Krakirian et al. | 386/230 |
| 2012/0224834 A1* | 9/2012 | Chen et al. | 386/293 |
| 2012/0301116 A1* | 11/2012 | Ellis | 386/292 |

* cited by examiner

*Primary Examiner* — Helen Shibru
(74) *Attorney, Agent, or Firm* — Ingrassia Fisher & Lorenz, P.C.

(57) ABSTRACT

A receiver receives a request for content associated with a channel, determines that all channel selectors are in use, selects a set of options, and transmits the set to a presentation device. The receiver may then fulfill the request utilizing a selected option. All available channel selectors may be in use because they are tuned to frequency bands of a broadcast signal to record content and data associated the channel is included in a different frequency band. The set of options may include options to stop the current recording in favor of the requested content and options to present content included in a same frequency band to which a tuner is already tuned. In one or more implementations, the receiver may determine that content currently being recorded will be rebroadcast at a later time and may include notifications indicating such and/or options to record the content at the later time.

10 Claims, 6 Drawing Sheets

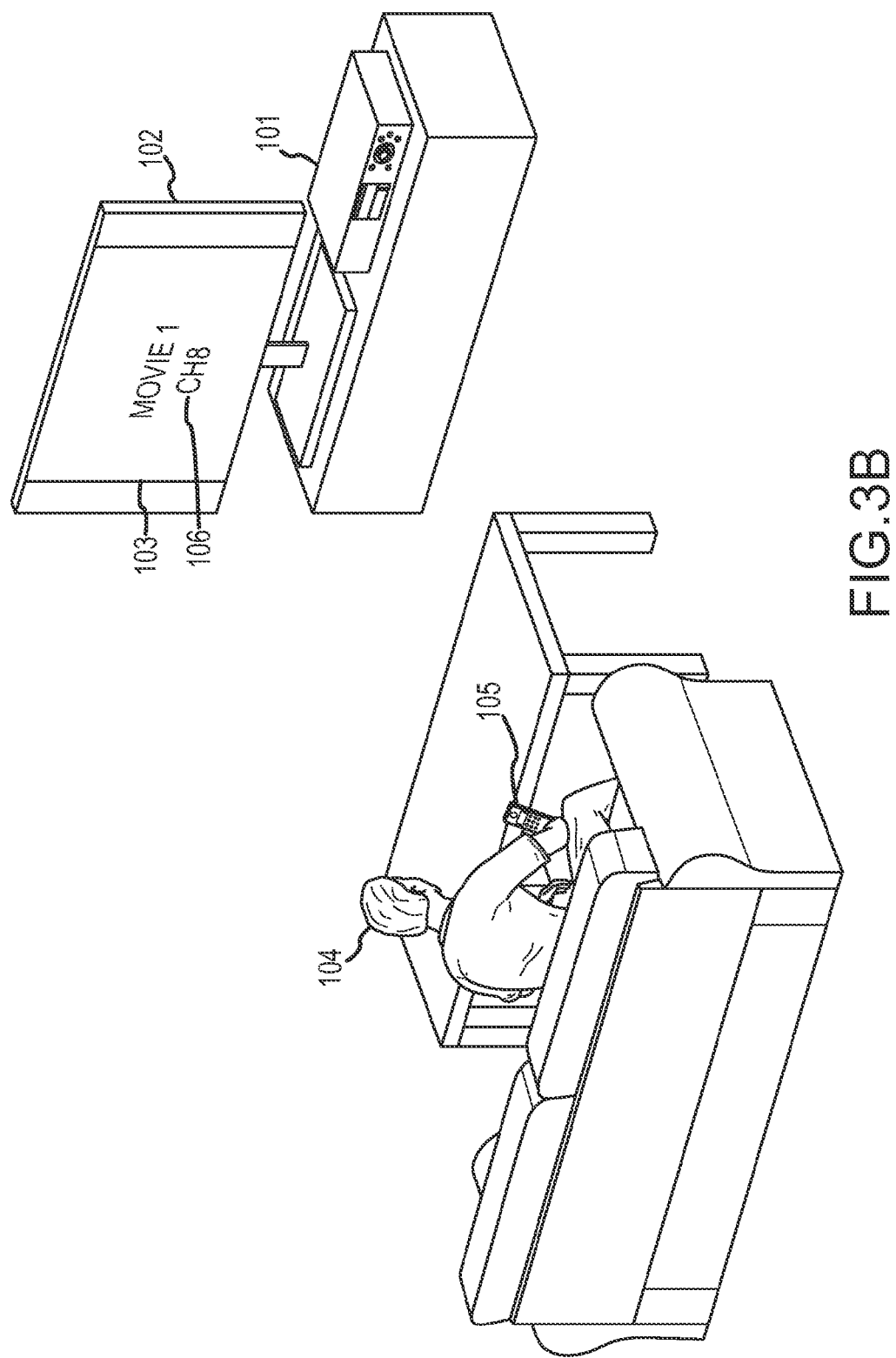

HANDLING REQUESTS WHEN AVAILABLE CHANNEL SELECTORS ARE IN USE

FIELD OF THE INVENTION

This disclosure relates generally to content receivers, and more specifically to handling requests for content when all channel selector components of a content receiver are in use by presenting content options that are available.

SUMMARY

The present disclosure discloses systems and methods for handling content requests when available channel selector components are in use. A content receiver may receive a request to obtain a first instance of content from at least one content provider that is associated with at least one first channel, determine that all available channel selector components are in use, select one or more sets of content presentation options that the at least one content receiver can provide, and transmit the set of options to a presentation device. The content receiver may then fulfill the request utilizing a selected option from the presented set.

In various cases, the content receiver may determine that all available channel selector components are in use because: the content receiver includes one or more channel selector components, the channel selector components are tuned to at least one first frequency band of at least one broadcast signal to record at least one second instance of content, and data associated the first channel is included in at least one second frequency band of the at least one broadcast signal. In some cases, the set of presentation options may include options to stop receiving and recording one or more instances of content currently being received and recorded in favor of the requested instance of content, options to receive and present one or more instances of content associated with a plurality of channels associated with data that are included in a same frequency band of the broadcast signal that a tuner is already tuned to in order to receive an instance of content that is currently being received and recorded, options to present one of more instances of content currently being received and recorded, and/or options to present one or more instances of content that are already stored. The options that the content receiver includes in the set of presentation options and/or omits from the set of presentation options may be based at least on one or more stored user preferences and/or defaults.

In one or more implementations, the content receiver may determine that one or more instances of content currently being received and recorded will be rebroadcast at a later time. In such implementations, the content receiver may include one or more notifications indicating that the instances of content currently being received and recorded will be rebroadcast at a later time in the set of presentation options and may include one or more options to set one or more recording timers to record the instance of content at the later time and utilize the respective tuner to present the requested instance of content.

In various implementations, the content receiver may utilize electronic programming guide data or other data to ascertain one or more characteristics of the requested instance of content as well as one or more characteristics of other instances of content that may be included in the set of presentation options. In such implementations, the content receiver may select options related to presenting other instances of content available from currently tuned frequency bands and/or from a non-transitory storage medium at least based on one or more shared characteristics between the requested instance of content and the other instances of content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 3A-3D are diagrams illustrating a user utilizing a system for handling content requests when available channel selector components are in use. The system may be the system of FIG. 1.

DETAILED DESCRIPTION OF THE EMBODIMENTS

Figure 1:
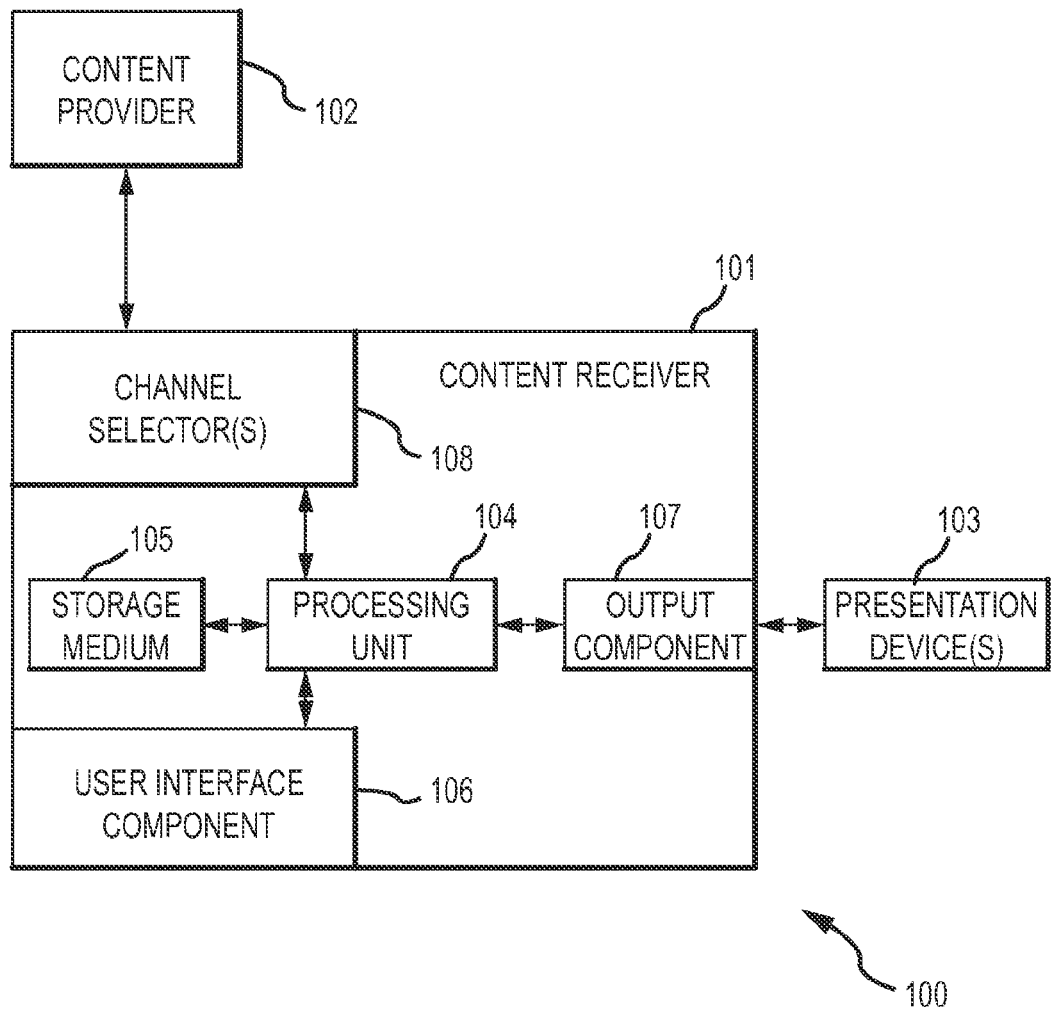
FIG. 1 is a block diagram illustrating a system for handling content requests when available channel selector components are in use.

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, mobile computers, cellular telephones, smart phones, tablet computers, desktop computers, and so on) may receive content from one or more content providers (such as satellite television programming providers, cable television programming providers, Internet service providers, video on demand providers, pay-per-view movie providers, digital music providers, and so on) via one of more communication connections (such as satellite communication connections, coaxial cable communication connections, Internet communication connections, radio-frequency connections, and so on) and may present such content to one or more presentation devices and/or store such content for later presentation. Such content may include one or more television programs, movies, on demand videos, digital music, and/or any other kind of content that may be presented by a content player.

In receiving content from a content provider for presentation and/or storage, the content receiver may utilize a channel selector (such as a tuner) or other such receiving component to receive the content as part of one or more signals broadcast by the content provider. The broadcast signal may include a plurality of different frequency bands and each of the frequency bands may include data associated with multiple instances of content (such as instances of content associated with a plurality of channels. When receiving content via such a broadcast signal for presentation and/or storage, the content receiver may tune the channel selector to the frequency band of the broadcast signal that includes data associated with the respective content and may select the data from that tuned frequency band that is associated with the respective content, discarding data associated with other content.

However, regardless of the number of channel selectors that a content receiver has available, that number is still generally finite. At any given time, one or more channel selectors of a content receiver may be utilized to record one or more instances of content. If a user attempts to utilize the content receiver to access content while all available tuners are in use, such as content that is included in a frequency band of the broadcast signal other than one that a channel selector is currently tuned to, the user may not be able to access the desired content and may not be aware of what other content options are still available from the content receiver despite the fact that all available channel selectors are in use.

The present disclosure discloses systems and methods for handling content requests when available channel selector components are in use. A content receiver may receive a request to obtain a first instance of content from at least one content provider. The first instance of content may be associated with at least one first channel. The content receiver may determine that all available channel selector components are in use because: the content receiver includes one or more channel selector components, the channel selector components are tuned to at least one first frequency band of at least one broadcast signal to record at least one second instance of content, and data associated the first channel is included in at least one second frequency band of the at least one broadcast signal. One or more sets of content presentation options that the at least one content receiver can provide may be selected by the content receiver that includes options to stop recording the second instance of content by in favor of receiving the first instance of content and options to present third instance of content that is associated with at least one second channel that is included in the first frequency band. Then, the content receiver may transmit the set of options to a presentation device and may fulfill the request utilizing a selected option from the presented set.

FIG. 1 is a block diagram illustrating a system 100 for handling content requests when available channel selector components are in use. The system 100 includes a content receiver 101, one or more content providers 102, and one or more presentation devices 103. The content receiver may be any kind of content receiver, such as a set top box, a television receiver, a digital video recorder, a mobile computer, a cellular telephone, a smart phone, a tablet computer, a desktop computer, and/or any other kind of electronic device that receives content from the content provider. The content provider may be any kind of content provider, such as a satellite television programming provider, a cable television programming provider, an Internet service provider, a video on demand provider, a pay-per-view movie provider, a digital music provider, and/or any other kind of provider that provides content to the content receiver. The presentation device may be any kind of presentation device, such as a television, a computer monitor, a cathode ray tube display, a liquid crystal display, a plasma screen display, a speaker, a printer, and/or any other kind of device that presents content transmitted by the content receiver.

The content receiver 101 may include one or more processing units 104, one or more non-transitory storage media 105 (which may take the form of, but is not limited to, a magnetic storage medium; optical storage medium; magneto-optical storage medium; read only memory; random access memory; erasable programmable memory; flash memory; and so on), one or more user interface components 106, one or more output components 107, and/or one or more channel selector(s) 108. The processing unit may execute instructions stored in the non-transitory storage medium to tune the channel selector to a frequency band of a broadcast signal from the content provider, receive data from the frequency band of the broadcast signal, and select at least a portion of the data for presentation (by transmitting the selected data to the presentation device 103 via the output component) and/or storage (by storing the selected data in the non-transitory storage medium). Additionally, the processing unit may execute instructions stored in the non-transitory storage medium to transmit content stored in the non-transitory storage medium to the presentation device via the output component. Such operations may be performed in response to user input received via the user interface component 106 and/or one or more recording timers stored in the non-transitory storage medium.

When processing unit 104 receives a request via the user interface component 106 to receive an instance of content associated with a first channel from the content provider 102 and present the instance of content by transmitting it to the presentation device 103 via the output component 107, the processing unit may determine that the channel selector 108 is not already in use and may perform receive the instance of content as requested. However, if the processing unit determines that the channel selector is already in use, the processing unit may not fulfill the request as requested.

The processing unit 104 may determine that the channel selector 108 is already in use if the channel selector is currently tuned to a first frequency band of a broadcast signal from the content provider 102 in order to receive one or more second instances of content from the content provider (and/or record the one or more other instance of content in the non-transitory storage medium 105) and data associated with the first channel (and thus the instance of content) is included in a second frequency band of the broadcast signal. As this example content receiver 101 only includes one channel selector (though in other implementations the content receiver may include multiple channel selectors and may determine whether or not all of the channel selectors are in use), the channel selector cannot be tuned to the second frequency band in order to obtain the first instance of content without disrupting receipt of the second instance of content.

Hence, when the processing unit 104 receives such a request and determines that all available channel selectors 108 are already in use (the one channel selector 108 in this example as this example content receiver 101 only includes one channel selector), the processing unit may select one or more sets of content presentation options to present instead of fulfilling the request as requested. The set of content presentation options may include options to stop recording an instance of content that is being received and recorded by the channel selector in order to utilize the channel selector to receive the requested instance of content. Further, as the channel selector is already receiving data associated with the entire set of channels included in the same frequency band of the broadcast signal that the channel selector is tuned to in order to receive and record the instance of content currently being recorded, the processing unit may include one or more options to receive and present one or more instances of content associated with such set of channels. Data for these instances of content associated with this set of channels may be available without disrupting the current recording as the channel selector is already receiving this data and would not need to tune to another frequency band of the broadcast signal. Additionally, the processing unit may include one or more options in the set of content presentation options to present the instance of content currently being recorded or present one or more instances of content already stored in the non-transitory storage medium. The processing unit may determine one or more of these options to include in the set or omit from the set based on one or more user preferences or defaults stored in the non-transitory storage medium.

The processing unit 104 may transmit the set of content presentation options to the presentation device 103 via the output component 107. Upon receipt of one or more of the options included in the set of content presentation options via the user interface component 106, the processing unit may then fulfill the request by performing the selected option(s) instead of fulfilling the request as originally requested. In this way, the request for the instance of content may be handled when all available channel selector(s) 108 are in use and a user of the content receiver 101 is not merely presented with an error message that their request is not possible at the current time.

Figure 2:
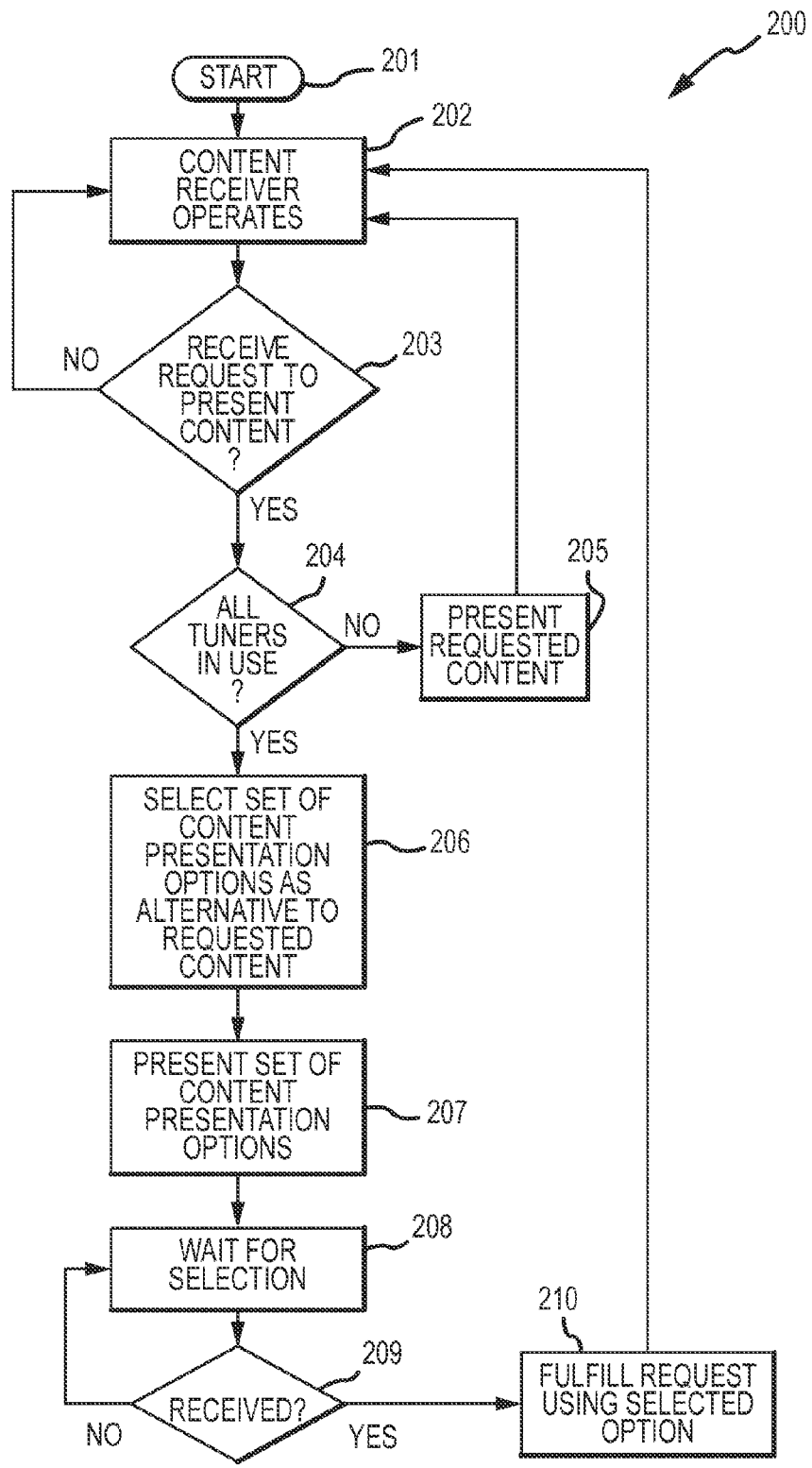
FIG. 2 is a flow chart illustrating a method for handling content requests when available channel selector components are in use. This method may be performed by the system of FIG. 1.

FIG. 2 illustrates a method 200 for handling content requests when available channel selector components are in use. The method 200 may be performed by the electronic device 101 of FIG. 1. The flow begins at block 201 and proceeds to block 202 where the content receiver 101 operates. The flow then proceeds to block 203 where the processing unit 104 determines whether or not a request to receive and present an instance of content that is associated with a first channel (the data for which is included in a first frequency band of a broadcast signal from the content provider 102) has been received. If so, the flow proceeds to block 204. Otherwise, the flow returns to block 202 where the content receiver continues to operate.

At block 204, after the processing unit 104 determines that a request to receive and present an instance of content that is associated with a first channel (the data for which is included in a first frequency band of a broadcast signal from the content provider 102) has been received, the processing unit determines whether or not all available tuners (such as channel selector(s) 108) are in use. The processing unit may determine that all available tuners are in use if all available tuners are already tuned to frequency bands other than the first frequency band in order to receive and record other instances of content. If not, the flow proceeds to block 205 where the processing unit presents the requested instance of content by tuning an available tuner to the first frequency band of the broadcast signal and transmitting at least a portion of the data associated with the first channel to the presentation device 103 via the output component 108. The flow returns to block 202 and the content receiver 101 continues to operate. Otherwise, the flow proceeds to block 206.

At block 206, after the processing unit 104 determines that all available tuners are in use, the processing unit may select a set of content presentation options as alternatives to receiving and presenting the requested instance of content. Such a set may include options to stop receiving and recording one or more instances of content currently being received and recorded in favor of the requested instance of content, options to receive and present one or more instances of content associated with a plurality of channels associated with data that are included in a same frequency band of the broadcast signal that a tuner is already tuned to in order to receive an instance of content that is currently being received and recorded, options to present one of more instances of content currently being received and recorded, and/or options to present one or more instances of content that are already stored in the non-transitory storage medium 105. The flow then proceeds to block 207 where the processing unit transmits the set of presentation options to the presentation device 103 via the output component 107 before the flow proceeds to block 208.

At block 208, after the set of presentation options has been presented via the presentation device 103, the processing unit 104 waits for a selection from the set of presentation options to be received and the flow proceeds to block 209. At block 209, the processing unit determines whether or not a selection from the set of presentation options has been received. If not, the flow returns to block 208 and the processing unit continues to wait for a selection from the set of presentation options to be received. Otherwise, the flow proceeds to block 210.

At block 210, after the processing unit 104 determines that a selection from the set of presentation options has been received, the processing unit fulfills the request utilizing the selected option. The flow then returns to block 202 where the content receiver 101 continues to operate.

Although the method 200 is illustrated and described as including particular operations in a particular order, it is understood that this is for the purposes of example. Different operations may be performed in a different order without departing from the scope of the present disclosure. For example, though steps 206 and 207 are illustrated and described as separate operations, in some implementations steps 206 and 207 may be performed simultaneously.

Returning to FIG. 1, in some implementations, when the processing unit 104 selects options to stop receiving and recording an instance of content that is currently being received and recorded in favor of the requested instance of content, the processing unit may determine whether or not the instance of content that is currently being received and recorded is scheduled to be broadcast again at a later time. This may be determined utilizing electronic programming guide data or other such data received from the content provider 102. If the instance of content that is currently being received and recorded is scheduled to be broadcast again at a later time, the processing unit may include information indicating such in the set of presentation options so that a user may be aware that the recording can be stopped and performed at the later time. In some examples of such implementations, the processing unit may include an option to schedule one or more recording timers to record the instance of content currently being received and recorded at the later time as part of the option to stop receiving and recording the instance of content in favor of the requested instance of content. In this way, the recording is not stopped in effect but merely delayed in order to receive and present the requested instance of content.

In one or more implementations, when the processing unit 104 selects options to present other instances of content that are associated with channels that have corresponding data included in a frequency band of the broadcast signal that the channel selector 108 is already tuned to in order to receive and record an instance of content that is being recorded, the processing unit may select such other instances of content that share one or more characteristics with the requested instance of content. Such characteristics may be determined utilizing electronic programming guide data or other such data received from the content provider 102. For example, the requested instance of content may be a news program and the other instances of content may include a different news program. In some examples of such implementations, only options to present other instances of content that share a characteristic with the requested instance of content may be included in the set of presentation options. However, in other examples of such implementations, options to present all other instances of content included in currently tuned frequency bands may be included.

In various implementations, when the processing unit 104 selections options to present instances of content that are already stored in the non-transitory storage medium 105, the processing unit may includes options for presenting instances of stored content that share one or more characteristics with the requested instance of content. Such characteristics may be determined utilizing electronic programming guide data or other such data received from the content provider 102. By way of a first example, the requested instance of content may be a soap opera. The processing unit may determine that a different soap opera is already stored in the non-transitory storage medium and may include an option to present the different soap opera in the set of presentation options. By way of a second example, the requested instance of content may be a particular game show episode. The processing unit may determine that copy of the same particular game show is already recorded in the non-transitory storage medium and may include an option to present the already recorded copy of the particular game show in the set of presentation options.

Figure 3A:
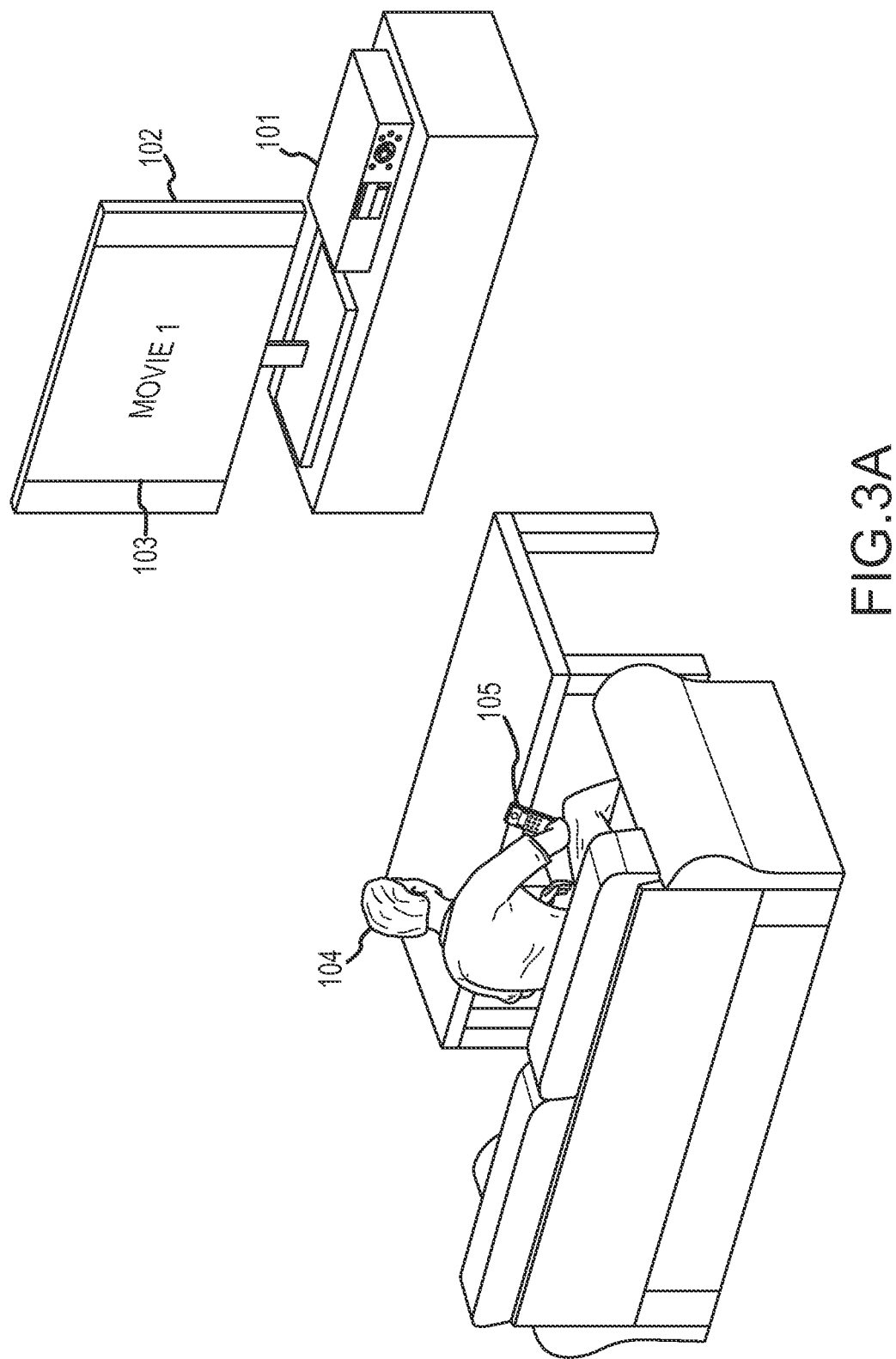

FIGS. 3A-3D illustrate a user 104 utilizing a system for handling content requests when available channel selector components are in use. The system may be the system of FIG. 1. As illustrated in FIG. 3A, the user is watching "Movie 1" that is being presented by a set top box 101 on the screen 103 of a television 102. As illustrated in FIG. 3B, the user attempts to utilize a remote control 105 to signal the set top box to stop presenting "Movie 1" and instead present channel 8 of a television programming signal which corresponds to a television program titled "Cop Show."

Figure 3C:
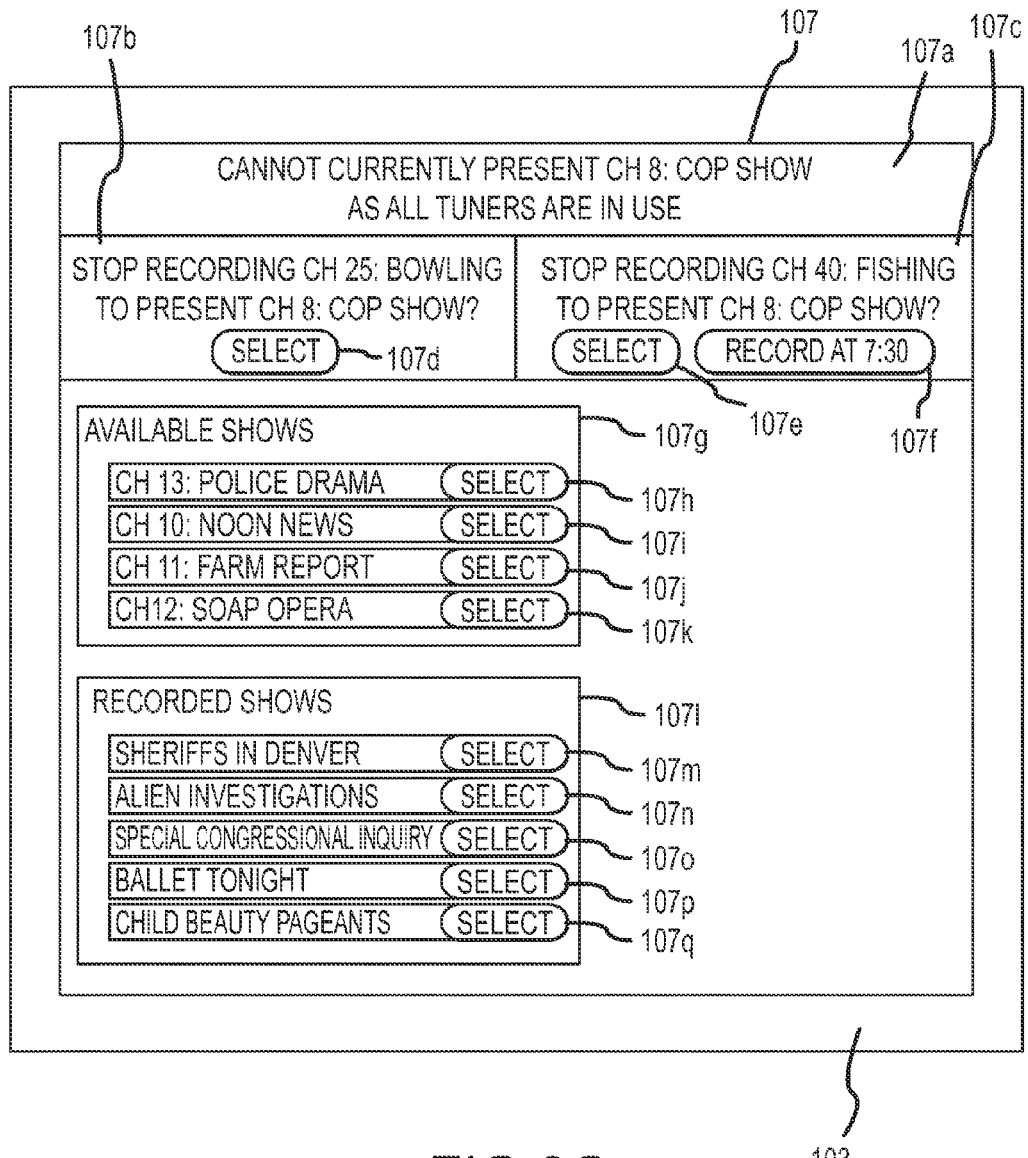

However, upon receiving the request, the set top box 101 ascertains that the two tuners available to the set top box are already recording a program associated with channel 25 titled "Bowling" and a program associated with channel 40 titled "Fishing." Further, the set top box ascertains that data associated with channel 8 is not included in the same frequency band of a broadcast signal as data associated with either channels 25 or 40. As the set top box in this example system includes two tuners, the set top box determines that both tuners are already in use and are thus cannot be utilized to present the requested instance of content without stopping one of the two recordings. Hence, the set top box selects a set of presentation options 107 and presents the set on the screen 103, as shown by FIG. 3C.

As illustrated, the displayed set of presentation options 107 includes a message that "Cop Show" cannot currently be presented as all tuners are in use. As also illustrated, the set of presentation options also includes an option 107b stop recording "Bowling" in favor of presenting "Cop Show" by selecting a selection button 107d, an option 107c to stop recording "Fishing" in favor of presenting "Cop Show" by selecting a selection option 107e, an option 107g to watch another show that is currently available even though both tuners are already in use (as data associated with those shows is included in one of the currently tuned frequency bands) by selecting one of selection buttons 107h-107k, and an option 107l to present a number of shows that are already stored by the set top box by selecting one of selection buttons 107m-107q.

As illustrated, when selecting the set of presentation options 107, the set top box determined that the show "Fishing" will be rebroadcast at 7:30. As such, the set top box included a button 107f that can be selected to set a recording timer to record "Fishing" at 7:30 and stop the current recoding of the show "Fishing" in favor of presenting "Cop Show."

Further, when selecting the shows that are currently available, the set top box analyzed electronic programming guide data associated with "Cop Show" to determine that it is related to law enforcement. The set top box also analyzed the currently available shows to determine that the show "Police Drama" is also related to law enforcement. As such, the set top box configured the list of available shows such that the show "Police Drama" is at the top of the list because it shares a characteristic with the requested instance of content, the characteristic of relating to law enforcement.

Similarly, when selecting the shows that are already stored by the set top box, the set top box analyzed electronic programming guide data associated with the already stored shows to determine that the stored show "Sheriffs in Denver" also has the characteristic that it is related to law enforcement. As such, the set top box configured the list of already stored shows such that the already recorded show "Sheriffs in Denver" is at the top of the list because it shares the "related to law enforcement" characteristic with the requested instance of content.

Although the set of presentation options 107 does not include options to present "Bowling" or "Fishing," in other example implementations the set of presentation options 107 may include options to present one or more instances of content currently being received and recorded.

Figure 3D:
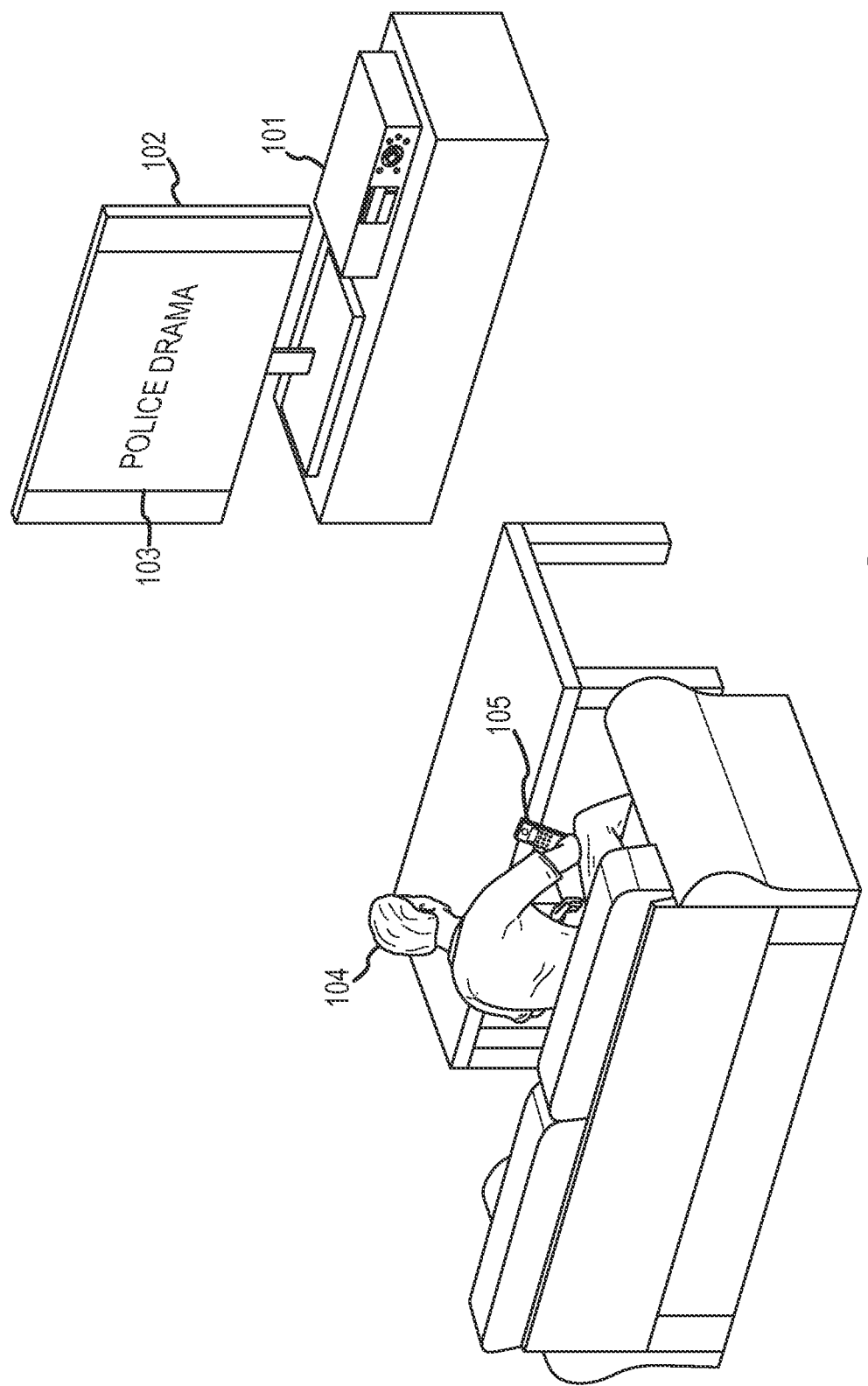

As illustrated in FIG. 3D, the user 104 selects the selection button 107h from the set of presentation options 107. As such, the set top box stops presenting "Movie 1" and instead presents the show "Police Drama." Although "Police Drama" is not the show that the user originally requested, the set top box is still able to present a law enforcement-related show to the user without having to stop recording of "Bowling" or "Fishing."

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method executable by a television receiver device having a plurality of television tuners that receive television programs via a plurality of different frequency bands, the method comprising:
    receiving, at the television receiver device, a request to obtain a first television program that is currently broadcast on a first channel of a first one of the different frequency bands;
    determining, by the television receiver device, that all available television tuners of the television receiver device are already tuned to receive other television channels that are broadcast on different frequency bands other than the first frequency band so that the television receiver device is not able to receive the first television program without disrupting reception of the other television channels;
    selecting, utilizing the content receiver, a set of content presentation options other than the first television program that the television receiver can provide in response to the request for the first television program, the set of options including at least one option to present a different program that is currently broadcast on one of the different frequency bands already being received by the television tuners of the television receiver device; and
    providing, utilizing the television receiver device, the set of content presentation options as an output to a presentation device.

2. The method of claim 1, further comprising selecting the different program based on at least one characteristic of the different program that is shared with the first television program.

3. The method of claim 1, wherein the set of content presentation options includes an option to stop recording one of the other channels, an option to present content received on one of the other channels, and at least one option to present at least one recorded instance of content stored by the television receiver device.

4. The method of claim 3, wherein said at least one option to present at least one recorded instance of content stored by the television receiver device further comprises selecting the at least one recorded instance of content from a plurality of recorded instances of content stored by the television receiver device wherein the at least one recorded instance of content is selected based on at least one characteristic of the content that is shared with the first television program.

5. The method of claim 4, wherein the at least one recorded instance of content comprises an earlier recorded copy of the first program.

6. The method of claim 1, wherein the television receiver device includes options in the set of content presentation options that the television receiver device can provide in response to the request based or a set of user preferences stored by the television receiver device.

7. A system for receiving direct broadcast satellite television content transmitted on a plurality of different frequency bands, wherein each of the different frequency bands carries one or more channels of television content, the system comprising:
    one or more available television tuners;
    an output component;
    at least one user interface component configured to receive a request to obtain a first television program on a first channel that is broadcast within a first one of a plurality of frequency bands;
    at least one processing unit configured to recognize that all of the one or more available television tuners are already tuned to other channels carried by different frequency bands other than the first frequency band, wherein the at least one processing unit is configured to select a substitute program that is receivable on the different frequency bands currently being received by the television tuners for presentation via the output component in place of the first television program when the system is not able to receive the first frequency band without disrupting reception of the other channels carried by the different frequency bands.

8. The system of claim 7, wherein the at least one substitute program is selected based on at least one characteristic of the content of the substitute program that is shared with the first television program.

9. A television receiver configured to receive a television programming that is broadcast from one or more satellites on a plurality of different frequencies, the television receiver comprising:
    a plurality of television tuners each configured to receive a portion of the television programming broadcast on one of the plurality of different frequencies;
    an interface configured to receive inputs from a user; and
    a processing unit configured to receive a user input via the interface that identifies a selected television program that is currently being broadcast on one of the different frequencies as part of the television programming, to identify that all of the plurality of television tuners are already receiving other programs broadcast on different frequencies other than the frequency that is broadcasting the selected television program, to identify a substitute television program that is being currently received on one of the different frequencies that is already being received by one of the television tuners, and to present the substitute television program to the user in place of the selected television program.

10. The television receiver of claim 9 wherein the substitute television program is selected based upon the content of the substitute television program so that the substitute television program has content that is similar to the selected television program.

* * * * *